United States Patent
Stamires et al.

(10) Patent No.: US 6,333,290 B1
(45) Date of Patent: *Dec. 25, 2001

(54) PROCESS FOR PRODUCING ANIONIC CLAYS USING MAGNESIUM ACETATE

(75) Inventors: Dennis N. Stamires, Newport Beach; Michael F. Brady, Studio City, both of CA (US); William Jones, Cambridge (GB); Fathi Kooli, Tsukuba (JP)

(73) Assignee: Akzo Nobel NV, Arnhem (NL)

(*) Notice: Subject to any disclaimer, the term of this patent is extended or adjusted under 35 U.S.C. 154(b) by 0 days.

This patent is subject to a terminal disclaimer.

(21) Appl. No.: 09/247,532

(22) Filed: Feb. 10, 1999

Related U.S. Application Data

(63) Continuation-in-part of application No. 09/021,840, filed on Feb. 11, 1998, now abandoned.

(51) Int. Cl.$^7$ .............. B01J 21/16; C01B 35/03
(52) U.S. Cl. .............. 502/80; 502/81; 502/84; 501/125
(58) Field of Search .............. 502/80, 81, 84; 501/108, 125, 127, 128, 129, 130, 133, 141, 153, 154

(56) References Cited

U.S. PATENT DOCUMENTS

| | | |
|---|---|---|
| 3,222,129 | 12/1965 | Osment et al. . |
| 3,796,792 | 3/1974 | Miyata et al. . |
| 3,844,978 * | 10/1974 | Hickson .............. 252/455 R |
| 3,844,979 * | 10/1974 | Hickson .............. 252/455 R |
| 3,879,523 | 4/1975 | Miyata et al. . |
| 3,879,525 | 4/1975 | Miyata et al. . |
| 4,051,072 | 9/1977 | Bedford et al. . |
| 4,351,814 | 9/1982 | Miyata et al. . |
| 4,458,026 | 7/1984 | Reichle . |
| 4,656,156 | 4/1987 | Misra . |
| 4,774,212 * | 9/1988 | Drezdon .............. 502/62 |
| 4,904,457 | 2/1990 | Misra . |
| 4,946,581 | 8/1990 | Van Broekhoven . |
| 4,952,382 | 8/1990 | Van Broekhoven . |
| 4,970,191 * | 11/1990 | Schutz .............. 502/341 |
| 5,064,804 * | 11/1991 | Soo et al. .............. 502/335 |

(List continued on next page.)

FOREIGN PATENT DOCUMENTS

| | | |
|---|---|---|
| A1 0 536 879 | 4/1993 | (EP) . |
| WO 91/10505 | 7/1991 | (WO) . |
| WO 91/18670 | 12/1991 | (WO) . |

OTHER PUBLICATIONS

Cavani et al., "Hydrotalcite–type Anionic Clays: Preparation, Properties and Applications", *Catalysis Today*, 11 (1991), pp. 173–301.

de Roy et al., Anionic Clays: Trends in Pillary Chemistry, "Synthesis of Microporous Materials", 1992, 2, pp. 108–169.

*Hel. Chim. Acta*, 25, 106–137 and 555–569 (1942).

(List continued on next page.)

*Primary Examiner*—Steven P. Griffin
*Assistant Examiner*—Cam N. Nguyen
(74) *Attorney, Agent, or Firm*—Oliff & Berridge, PLC

(57) ABSTRACT

Economical and environment-friendly processes for the synthesis of anionic clays and anionic clay-like materials with acetate anions as the charge-balancing interlayer species are disclosed. The processes involve combining a slurry of a gibbsite or its thermally treated form with a slurry or solution of a magnesium source and magnesium acetate. The product is not washed, needs no filtration and exists in a close-to-neutral pH condition. The product can be spray dried directly to form microspheres, or it can be extruded to form shaped bodies. Because of the absence of foreign salts, the product can be combined with other ingredients in the manufacture of catalysts, absorbents, pharmaceuticals, cosmetics, detergents and other commodity products that contain anionic clays.

8 Claims, 5 Drawing Sheets

U.S. PATENT DOCUMENTS

| | | | |
|---|---|---|---|
| 5,079,203 | | 1/1992 | Pinnavaia et al. . |
| 5,104,987 | * | 4/1992 | King .................................... 544/401 |
| 5,112,784 | * | 5/1992 | Atkins et al. ......................... 502/80 |
| 5,114,898 | | 5/1992 | Pinnavaia et al. . |
| 5,153,156 | * | 10/1992 | Schutz et al. ......................... 502/63 |
| 5,202,496 | * | 4/1993 | Schutz et al. ....................... 568/388 |
| 5,214,142 | * | 5/1993 | King .................................... 544/111 |
| 5,246,899 | * | 9/1993 | Bhattacharyya ...................... 502/84 |
| 5,247,103 | * | 9/1993 | King et al. .......................... 549/510 |
| 5,260,495 | * | 11/1993 | Forkner ............................... 568/867 |
| 5,399,537 | | 3/1995 | Bhattacharyya et al. . |
| 5,407,652 | * | 4/1995 | Swamy et al. .................... 423/239.1 |
| 5,439,861 | | 8/1995 | Bhattacharyya et al. . |
| 5,472,677 | * | 12/1995 | Farris et al. ...................... 423/239.1 |
| 5,474,602 | * | 12/1995 | Brown et al. ..................... 106/18.26 |
| 5,507,980 | | 4/1996 | Kelkar et al. . |
| 5,514,316 | | 5/1996 | Kosugi et al. . |
| 5,578,286 | | 11/1996 | Martin et al. . |
| 5,591,418 | | 1/1997 | Bhattacharyya et al. . |
| 5,939,353 | * | 8/1999 | Bhattacharyya et al. ............ 502/524 |
| 6,028,023 | * | 2/2000 | Vierheilig .............................. 502/84 |
| 6,171,991 | * | 1/2001 | Stamires et al. ..................... 501/141 |

OTHER PUBLICATIONS

F. G. Buttler et al., "Studies on $4CaO-Al_2O_3-13H_2O$ and the Related Natural Mineral Hydrocalumite", *J. Am. Ceram. Soc.*, 42, No. 3, (1959), pp. 121–126.

S. Miyata et al., "Synthesis of Mew Hydrotalcite–like Compounds and Their Physico–Chemical Properties," *Chemistry Letters* (Japan), 1973, pp. 843–848.

S. Miyata, "The Synthesis of Hydrotalcite–like Compounds and Their Structures and Physico–Chemical Properties—I: The Systems $Mg^{2+}Al^{3+}NO^{-3}$, $Mg-Al^{3+}Cl^-$, $Mg^{2+}$, $-ClO_4^-$, $Ni^{2+}Cl^-$ and $Zn^{2+}-Al^{3+}-Cl$", *Clays and Clay Minerals*, 23, 1975, pp. 369–375.

S. Miyata, "Physico–Chemical Properties of Synthetic Hydrotalcites in relation to Composition", *Clays and Clay Minerals*, 28, No. 1, 1980, pp. 50–56.

I. Pausch et al., "Syntheses of Disordered and Al–Rich Hydrotalcite–like Compounds", *Clays and Clay Minerals*, 34, No. 5, 1996 pp. 507–510.

Ulibarri et al., "Textural Properties of Hydrotalcite–like Compounds $[Al_2Li(OH)_6]^{+X^{m-}}{}_{1/m}-nH_2O$ ($X^{m-}=CO^{2-}{}_3$, $NO^{-3}$, $Cl^-$", *Materials Chemistry and Physics*, 14, 1986, pp. 569–579.

* cited by examiner

FIGURE 1 commercially available Mg-Al acetate anionic clay
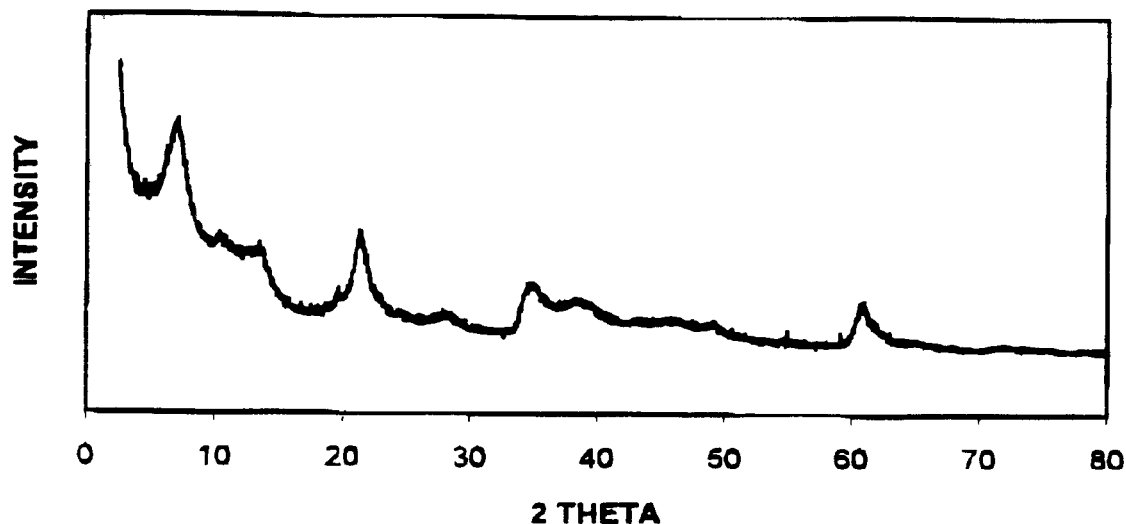
FIGURE 2 Mg-Al acetate anionic clay prepared by coprecipitation
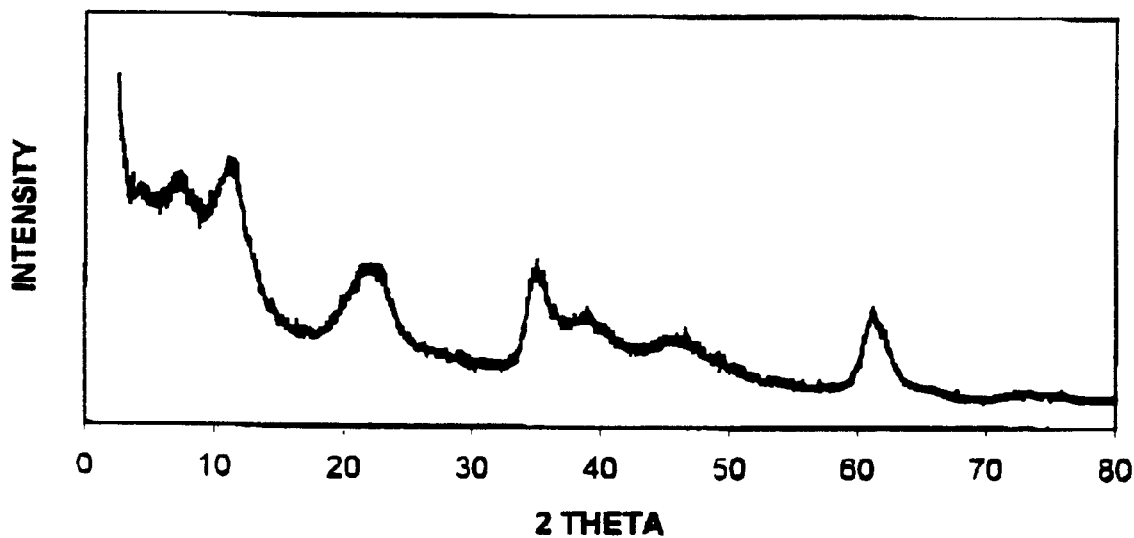

FIGURE 3 Mg-Al acetate anionic clay prepared by coprecipitation
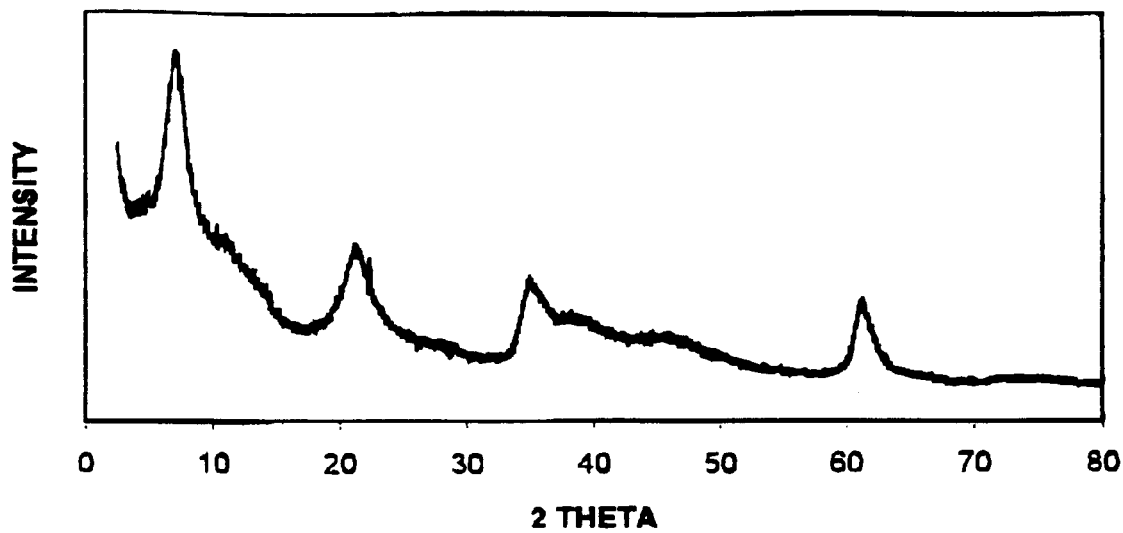
FIGURE 4 Mg-Al acetate anionic clay prepared by coprecipitation
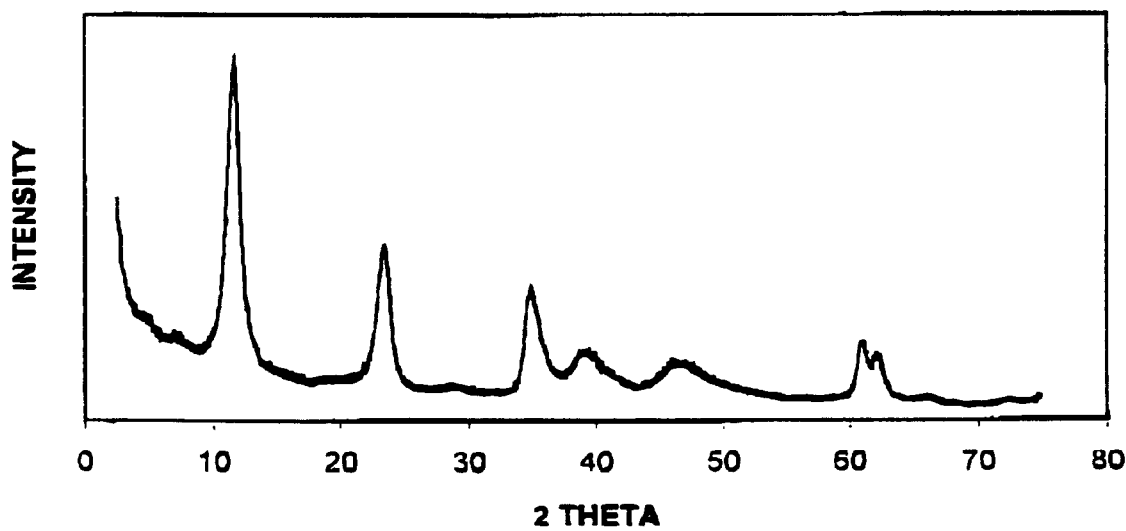

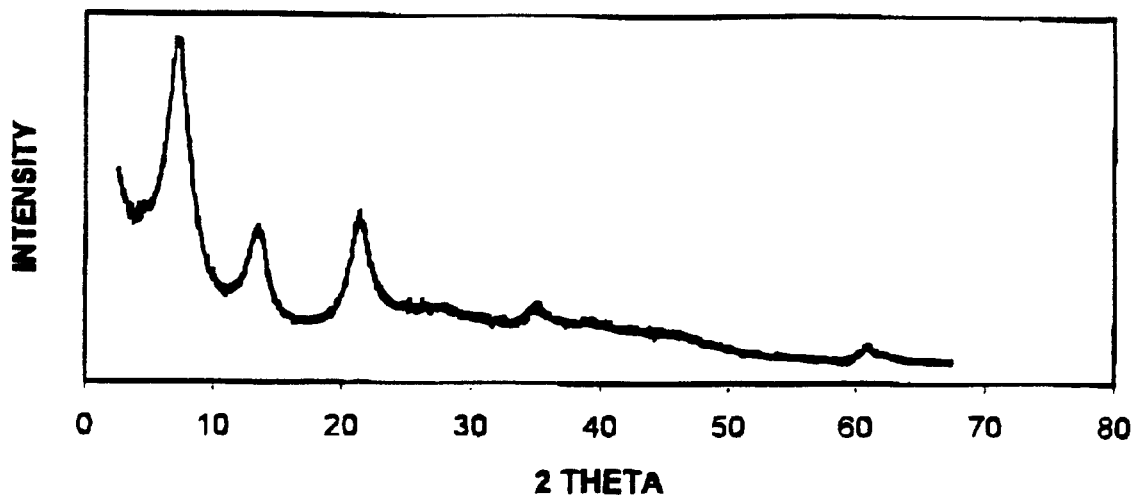
FIGURE 5A Mg-Al acetate anionic clay prepared by the process according to the invention prior to drying
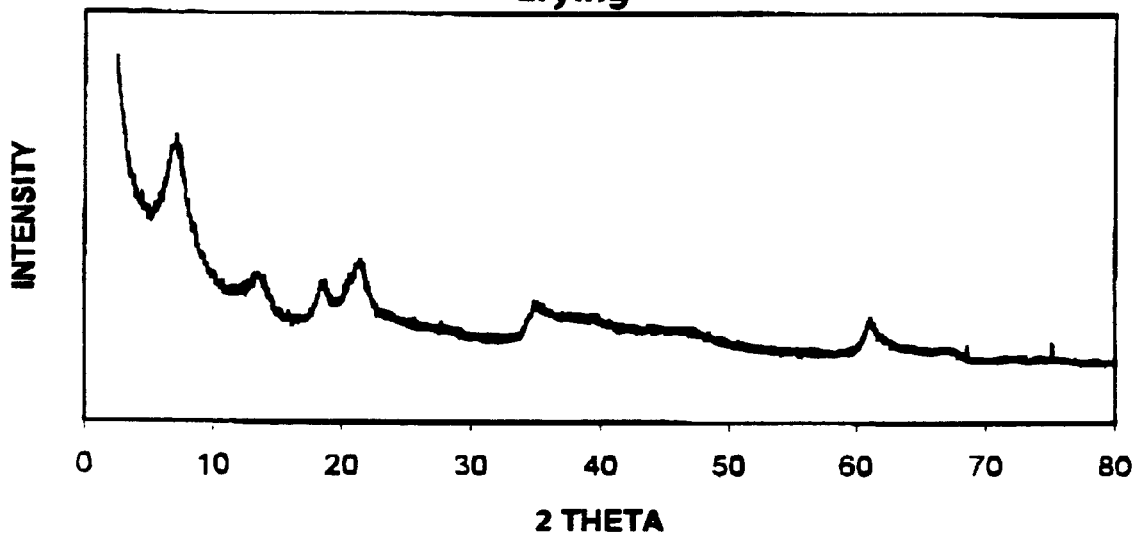
FIGURE 5B Mg-Al acetate anionic clay prepared with the process according to the invention after drying

FIGURE 6 Mg-Al acetate anionic clay prepared according by the process to the invention
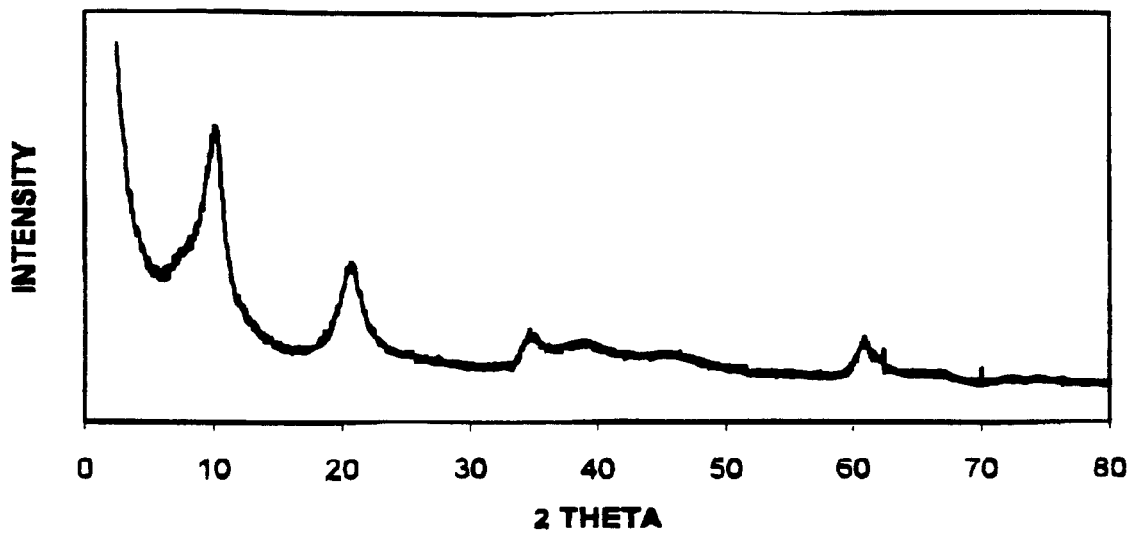
FIGURE 7 Mg-Al acetate anionic clay prepared by the process according to the invention
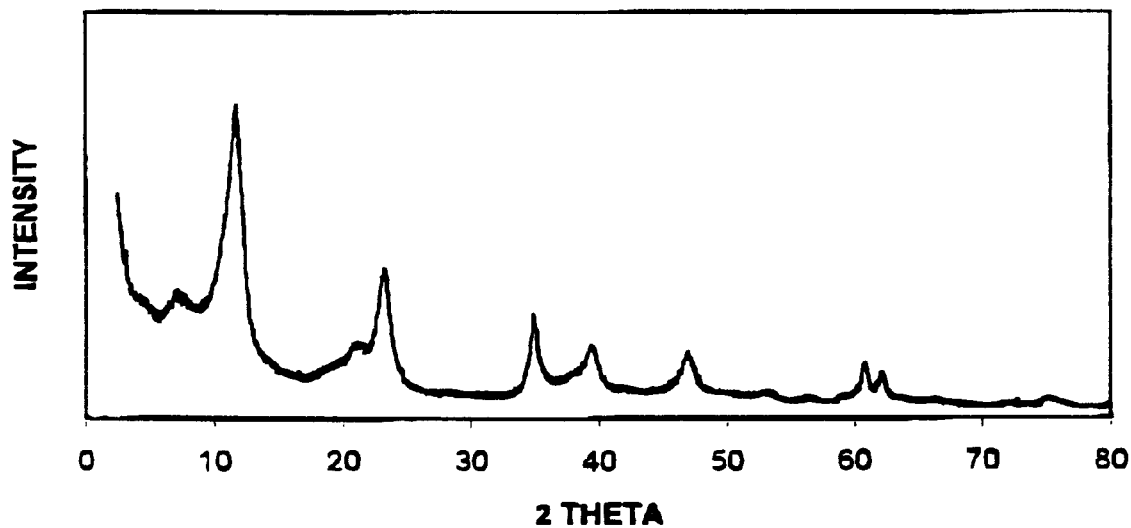

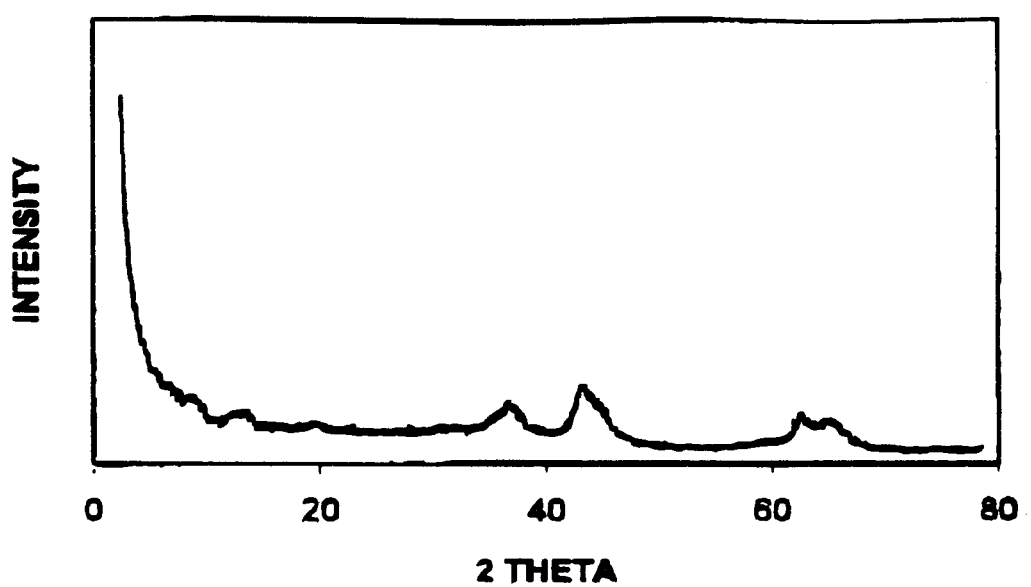
FIGURE 8 Mg-Al solid solution obtained upon heat-treatment of the anionic clay

PROCESS FOR PRODUCING ANIONIC CLAYS USING MAGNESIUM ACETATE

This is a Continuation-in-Part of application Ser. No. 09/021,840 filed Feb. 11, 1998 now abandoned. The entire disclosure of the prior application is hereby incorporated by reference herein in its entirety.

BACKGROUND OF THE INVENTION

This invention involves the preparation of anionic clays, more in particular, anionic clays with acetate as a charge balancing anion and the preparation of Mg—Al solid solutions by heat-treatment of the anionic clay. Anionic clays have a crystal structure which consists of postively charged layers built up of species combinations of metal hydroxides been which there are anions and water molecules. Hydrotalcite is an example of a naturally occurring anionic clay.

In hydrotalcite-like anionic clays the brucite-like main layers are built up of octahedra alternating with interlayers in which water molecules and anions, more particularly carbonate ions, are distributed. The interlayers contain anions such as $NO_3^-$, $OH^-$, $Cl^-$, $Br^-$, $I^-$, $SO_4^{2-}$, $SiO_3^{2-}$, $CrO_4^{2-}$, $BO_3^{2-}$, $MnO_4^-$, $HGaOs_3^{2-}$, $HVO_4^{2-}$, $ClO_4^-$, $BO_3^{2-}$ monocarboxylates such as acetate, dicarboxylates such as oxalate, and alkyl sulphonates such as laurylsulphonate.

It should be noted that a variety of terms are used to describe the material which is referred to herein as an anionic clay. Hydrotalcite-like and layered double hydroxide are interchangeably used by those skilled in the art. Herein we refer to the materials as anionic clays, comprising within that term hydrotalcite-like and layered double hydroxide materials.

The preparation of anionic clays has bean described in many prior art publications.

Recently, two major reviews of anionic clay chemistry were published in which the synthesis methods available for anionic clay synthesis have been summarized, F. Cavani et al, "Hydratalcitetype anionic clays: Preparation, Properties and Applications," *Catasis Today"*, 11 (1991) Elsevier Science Publishers B. V. Amsterdam.

J P Besse and others, *"Anionic clay: trends in pillaring chemistry its synthesis and micropgrous solids"* (1992)2,108 M. I. Ocelli and H. E. Robson, Van Nostrand Reinhold, N.Y.

In these reviews the authors state that a characterstic of anionic clays is that mild calcination at 500° C. results in the formation of a disordered MagO-like product. The disordered MgO-like product is distinguishable from spinel (which results upon severe calcineation) and from anionic clays. Furthermore, these Mg—Al solid solutions contain a well-known memory effect whereby the exposure to water of such calcined materials results in the reformation of the anionic clay structure.

For work on anionic clays, reference is given to the following articles:
HElv. Chim. Acta, 25, 106–137 and 555–569 (1942)
J. Am. Ceram. Soc., 42, no. 3, 121 (1959)
Chemistry Letters (Japan), 843 (1973)
Clays and Clay Minerals, 23, 369 (1975)
Clays and Clay Minerals, 28, 50 (1980)
Clays and Clay Minerals, 34, 507 (1996)
Materials Chemistry and Physics, 14, 569 (1986).

In addition there is an extensive amount of patent literature on the use of anionic clays and processes for their preparation.

European Patent Application 0 536 979 describes a method for introducing pH-dependent anions into the clay. The clay is prepared by the addition of a solution of $Al(NO_3)_3$ and $Mg(NO_3)_2$ to a basic solution containing borate anions. The product is then filtered, washed repeatedly with water, and dried ovenight Addtionally mixtures of Zn/Mg are used.

In U.S. Pat. No. 3,796,792 by Miyata entitled "composite Metal Hydroxides" a range of materials is prepared into which an extensive range of $M^+$ cations is incorporated, including Sc, La, Th, In, etc. In the examples given solutions of the divalent and trivalent cations are prepared and mixed with a base to cause co-precipitation. The resulting products are dehydrated, washed with water, and dried at 80° C. Example 1 refers to Mg and Al and Example 2 to Mg, and Bi. Other examples are given, and in each case soluble salts are used to make solutions prior to precipitation of the anionic clay at high pH.

In U.S. Pat. No. 3,879,523 by Miyata entitled "Composite Metal Hydroxides" also a large number of preparation examples is outlined. The underlying chemistry, however, is again based on the co-precipitation of soluble salts followed by washing and drying. It is important to emphasize that washing is a necessary part of such preparations, because to create a basic environment for co-precipitation of the metal ions, a basic solution is needed and this is provided by $NaOH/Na_2CO_3$ solutions. Residual sodium, for example, can have a significant deleterious effect on the subsequent performance of the product as a catalyst or oxide support.

In U.S. Pat. No. 3,879,525 (Miyata) very similar procedures are again described.

In U.S. Pat. No. 4,351,814 to Miyata et al. a method for making fibrous hydrotalcites is described. Such materials differ in structure from the normal plate-like morphology. The synthesis again involves soluble salts For example, an aqueous solution of a mixture of $MgCl_2$ and $CaCl_2$ is prepared and suitably aged. From this a needlelike product $Mg_2(OH)_3Cl.4H_2O$ precipitates. A separate solution of sodium aluminate is then reacted in an autoclave with the solid $Mg_2(OH)_3Cl.4H_2O$ and few product is again fifitered, washed with water, and dried.

In U.S. Pat. No. 4,458,026 to Reichle, in which heat-treated anionic clays are described as catalysts for aldol condensation reactions, again use is made of magnesium and aluminum nitrate salt solutions. Such solutions being added to a second solution of NaOH and $Na_2CO_3$. After precipitation the slurry is filtered and washed twice with distilled water before drying at 125° C.

In U.S. Pat. No. 4,656,156 to Misra the preparation of a novel absorbent based on mixing activated alumina and hydrotalcite is described. The hydrotalcito is made by reacting activated MgO (prepared by activating a magnesium compound such as magnesium carbonate or magnesium hydroxide) with aqueous solutions containing aluminate, carbonate and hydroxyl ions. As an example the solution is made from NaOH, $Na_2CO_3$ and $Al_2O_3$. In particular, the synthesis involves the use of industrial Bayer liquor as the source of Al. The resulting products are washed and filtered before drying at 105° C.

In U.S. Pat. No. 4,904,457 to Misra a method is described for producing hydrotalcites in high yield by reacting activated magnesia with an aqueous solution containing aluminate, carbonate, and hydroxyl ions.

The methodology is repeated in U.S. Pat. No. 4,656,158.

In U.S. Pat. No. 5,507,980 to Kelkar et at al. a process is described for making novel catalysts, catalyst supports, and absorbers comprising synthetic hydrotalcilike binders. The synthesis of the typical sheet hydrotalcite involves reacting pseudo-boehmite to which acetic acid has been added to peptize the pseudo-boehmite. This is then mixed with magnesia. More importantly, the patent summary states clearly that the invention uses mono carboxylic organic acids such as formic, propionic and isobutyric acid. In this patent the conventional approaches to preparing hydrotalcites are presented.

In U.S. Pat. No. 5,439,881 a process is disclosed for preparing catalysts for synthesis gas production based on hydrotalcites. The method of preparation is again based, on the co-precipitation of soluble salts by mixing with a base, for example, by the addition of a solution of $RhCl_3$, $Mg(NO_3)_2$ and $Al(NO_3)_3$ to a solution of $Na_2CO_3$ and NaOH.

Also, in U.S. Pat. No. 5,399,537 to Bhattacharyya in the preparation of nickel-containing catalysts based on hydrotalcite use is made of the co-precipitation of soluble magnesium and aluminium salts.

In U.S. Pat. No. 5,591,418 to Bhattacharyya a catalyst for removing sulphur oxides or nitrogen oxides from a gaseous mixture is made by calcining an anionic clay, the anionic clay having been prepared by co-precipitation of a solution of $Mg(NO_3)_2$, $Al(NO_3)_3$ and $Ce(NO_3)_3$. The product again is filtered and repeatedly washed with deionized water.

In U.S. Pat. No. 5,114,898/WO 9110505 Pinnavaia et al. describe layered double hydroxide sorbents for the removal of sulphur oxide(s) from flue gases, which layered double hydroxide is prepared by reacting a solution of Al and Mg nitrates or chlorides with a solution of NaOH and $Na_2CO_3$. In U.S. Pat. No. 5,079,203/WO 9118670 layered double hydroxides intercalated with polyoxo anions are described, with the parent clay being made by co-precipitation techniques.

In U.S. Pat. No. 5,578,286 in the name of Alcoa a process for the preparation of meixnerite is described. The meixnertte may be contacted with a dicarboxylate or polycarboxylate anion to farm a hydrotalcite-like material. In comparative examples 1–3 hydromagnesite is contacted with aluminum trihydrate in a $CO_2$ atmosphere, greater than 30 atmospheres. No hydrotalcite was obtained in these examples.

In U.S. Pat. No. 5,514,316 a method for the preparation of meixnerite is described using magnesium oxide and transition alumina. For comparative purposes aluminum trihydrate was used in combination with magnesium oxide. It was indicated that this method did not work as well as with transition alumina.

In U.S. Pat. Nos. 4,946,581 and 4,952,382 to van Broekhoven coprecipitation of soluble salts was used for the preparation of anionic clays as catalyst components and additives.

A variety of anions and di- and tri-valent cations are described.

As indicated in the description of the prior art given-above, there are many applications of anionic clays.

These include but are not restricted to: catalysts, adsorbents, drilling muds, catalyst supports and carriers, extenders and applications in the medical field. In particular van Broekhoven has described their use in $SO_x$ abatement chemistry.

Because of this wide variety of largescale commercial applications for these materials, new processes utilizing alternative raw materials and which can be carried out in continuous mode are needed to provide a more cost-effective and environmentally compatible processes for making anionic clays. In particular, from the prior art described above one can conclude that the preparation process can be improved in the following ways: the use of cheaper sources of reactants, processes for easier handling of the reactants, so that there is no need for washing or filtration, eliminating the filtration problems associated with these fine-particle materials, the avoidance of alkali metals (which can be particularly disadvantageous for certain catalytic applications): The use of organic acids (to peptize any alumina) is expensive and introduces an additional step in the synthesis process and is therefore not cost-effective. Further, in drying or calcining the anionic clay prepared by prior art processes gaseous emissions of no oxides, halogens, sulphur oxides, etc, are encountered which cause environmental pollution problems.

SUMMARY OF THE INVENTION

This invention includes a process for producing anionic clays using novel raw materials which are inexpensive and utilizing such raw materials in a simple process which is extremely suitable to be carried out in continuous mode. The process involves reacting mixtures in water at ambient or elevated temperature at atmospheric or elevated pressure. Such processes can be operated in standard laboratory/industrial equipment. More specifically, there is no need for washing or filtering, and a wide range of ratios of Mg/Al is possible.

For example, one of the preferred embodiments of this invention involves the use of a calcined alumina trihydrate (gibbsite) in a slurry. In this process magnesium source and magnesium acetate can be added at ambient or elevated temperature at atmosheric or elevated pressure, and the reaction mixture results in the formation of an anionic clay with hydrotalcilike structure, with acetate anions incorporated directly into the interlayer region. The powder X-ray diffraction pattern (PXRD) suggests that the quality of the product is comparable to acetate-containing anionic clays made by other standard methods. The physical and chemical properties of the product also are equal if not superior to those anionic clays made by the other conventional methods. The overall process of this invention is very flexible, enabling a wide variety of anionic clay compositions and anionic clay-like materials to be prepared in an economically and environmental-friendly manner.

BRIEF DESCRIPTION OF THE DRAWINGS

FIG. 1 shows a PXRD pattern of commercially available Mg—Al acetate anionic cay.

FIG. 2 shows a PXRD pattern of a Mg—Al at anionic clay prepare by coprecipitation.

FIG. 3 shows a PXRD pattern of a Mg—Al acetate anionic clay prepared by coprecipitation FIG. 4 shows a PXRD pattern of a Mg—Al acetate anionic clay prepared by coprecipitation.

FIG. 5a shows a PXRD pattern of a Mg—Al acetate anionic clay prepared by the process according to the invention prior to drying FIG. 5b shows a PXRD pattern of a Mg—Al acetate anionic clay prepared by the process according to the invention after drying.

FIG. 6 shows a PXRD pattern of a Mg—Al acetate anionic clay with a Mg/Al ratio of 1.44 prepared by the process according to the invention.

FIG. 7 shows a PXRD pattern of a Mg—Al acetate anionic clay with a Mg/Al ratio of 2.57 prepared by the process according to Om invention.

FIG. 8 shows a PXRD pattern of a Mg—Al solid solution obtained upon heat-treatment of a Mg—Al acetate anionic clay prepared by the process according to the invention.

DETAILED DESCRIPTION OF THE INVENTION

The present invention pertains to a process for the preparation of an anionic clay by reacting a slurry comprising aluminium trihydrate or its thermally treated form with a magnesium source and magnesium acetate. The reaction results in the direct formation of an anionic clay with acetate anions as the interlayer charge-balancing species. The reaction takes place at ambient temperature or higher. At temperatures higher than 100° C., the reaction is preferably carried out under autogeneous conditions. In this method acetate anions are provided in the reaction medium as a soluble magnesium acetate salt and Incorporated into the interlayer as the necessary charge balancing anion.

Anionic clays prepared by this method exhibit the well known properties and characteristics (e.g. chemical analysis. powder X-ray diffraction pattern, FRIR, thermal decomposition characteristics, surface area, pore volume, and pore size distribution) usually associated with acetate-containing anionic clays prepared by the customary and previously disclosed methods.

Upon being heated, anionic clays generally decompose to Mg—Al solid solutions, and at higher temperatures spinels. When used as a catalyst, an adsorbent (for instance a $SO_x$ adsorbent for catalytic cracking reactions), or a catalyst support, the anionic clay according to the invention is usually heated during preparation and is thus in the Mg—Al solid solution form. During use in an FCC unit, the catalyst or adsorbent is converted from an anionic clay into Mg—Al solid solutions.

Therefore, the present invention is also directed to a process wherein an anionic clay prepared by reacting a slurry comprising aluminum trihydrate and a magnesium oxide source, is heat-treated at a temperature between 300 and 1200° C. to form a Mg—Al solid solution.

The anionic clay according to the Invention has a layered structure corresponding to the general formula

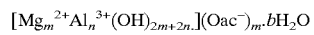

$$[Mg_m^{2+}Al_n^{3+}(OH)_{2m+2n}](Oac^-)_m \cdot bH_2O$$

Wherein OAc=acetate, m and n have a value such that m/n=1 to 10, preferably 1 to 6, and b has a value in the range of from 0 to 10, generally a value of 2 to 6 and often a value of about 4. It is preferred that m/n should have a value of 2 to 4, more particularly a value close to 3.

Since the process disclosed in this patent does not require washing of the product or filtering, there is no filtrate waste or gaseous emissions (e.g. from acid decomposition), making the process particularly environmental-friendly and more suited to the environmental constraints which are increasingly imposed on commercial operations. The product can be spray dried directly to form microspheres or can be extruded to form shaped bodies.

Alumina Source

The present invention includes the use of crystalline aluminum trihydrate (ATH), for example gibbsites provided by Reynolds Aluminium Company RH-20® or JM Huber Micral® grades. Also BOC (Bauxite Ore Concentrate), bayente and nordstrandite are suitable aluminum trihydrates. BOC is the cheapest alumina source. The alumina trihydrate is preferred to have a small particle size. In another embodiment of the invention thermally treated forms of gibbsite are used. Combinations of aluminum trihydrate and thermally treated forms of aluminium trihydrate can also be used. The calcined aluminium trihydrate is readily obtained by thermally treating aluminum trlhydrate (gibbsate) at a temperature ranging from 100 to 800° C. for 15 minutes to 24 hours. In any event, the calcining temperature and time for obtaining calcined aluminum trihydrate should be sufficient to cause a measurable increase of the surface area in view of the surface area of the gibbsite as produced by the Bayer process which is generally between 30 and 50 m²/g. It should be noted that within the concept of this invention flash calcined alumina is also considered to be a thermally treated form of aluminum trihydrate, although generally it is considered a very specific alumina. Flash calcined alumina is obtained by treating aluminum trihydrate at temperatures between 800–1000° C. for very short periods of time in special industrial equipment, as is described in U.S. Pat. Nos. 4,051,072 and 3,222,129. Combinations of various thermally treated forms of aluminum trihydrate can also be used. Preferably the aluminum source is added to the reactor in the form of a slurry. In particular it is emphasized that there is no need to use a peptizable alumina source (gibbsite is not peptizabie) and as a result no need to add either mineral or organic acid to vary the pH of the mixture. In the process according to this invention other aluminum sources beside aluminum trihydrate or its thermally treated forms may be added to the slurry such as oxides and hydroxides of aluminum, (e.g. sols, flash calcined alumina, gels, pseudo-boehmite, boehmite) aluminum salts such as aluminum nitrate, aluminum chloride, aluminum chlorohydrate and sodium aluminate. The other aluminum sources may be soluble or insoluble in water and may be added to the aluminum trihydrate and/or its thermally treated form or it may be added to the slurry separately as a solid, a solution or as a suspension.

Magnesium Source

Mg-bearing sources which may be used include MgO, $Mg(OH)_2$, magnesium acetate, magnesium formats, magnesium hydroxy acetate, hydromagnesite ($Mg_5(CO_3)_4(OH)_2$), magnesium carbonate, magnesium bicarbonate, magnesium nitrate, magnesium chloride, dolomite and sepiolite. Both solid Mg sources and soluble Mg salts are suitable. Also combinations of Mg sources may be used. The magnesium source may be added to the reactor as a solid, a solution, or, preferably, as a slurry. The magnesium source may also be combined with the aluminum source before it is added to the reactor.

The magnseium acetate may be added to the slurry containing aluminum trihydrate or its thermally treated form and/or magnesium source or vice versa.

Acetic acid may also be added to the slurry to increase the acetate concentration and/or control pH. Also other metal acetate salts may be added e.g. zinc acetate provided it is acceptable that divalent cations other than Mg may enter the anionic clay structure.

Conditions

Because of its simplicity, this process is particularly suitable to be carried out in a continuous mode. Thereto an aluminum source and a magnesium source are fed to a reactor and reacted in aqueous suspension to obtain an anionic clay-containing compostion. In the case of a batch process an aluminum source and a magnesium source are added to a reactor and reacted in aqueous suspension to obtain an anionic clay-containing composition.

Within the context of this invention a reactor is considered to be any confined zone in which the reaction between the aluminum source and magnesium source takes place. The reactor may be equipped with stirrers, baffles etc. to ensure homogeneous mixing of the reactants. The reaction can take place with or without stirring, at ambient or at elevated temperature and at atmospheric or elevated pressure.

Usually, a temperature between 0 and 100° C. is used at or above atmospheric pressure. It is preferred to carry out the process at temperatures above 50° C. rather than at room temperature, because this results in anionic clays with sharper peaks in the x-ray diffraction pattern than anionic clay-containing compositions obtained at room temperature. The reactor may be heated by any heating source such as a furnace, microwave, infrared sources, heating jackets (either electrical or with a heating fluid), lamps, etc.

The aqueous suspension in the reactor may be obtained by either adding slurries of the starting materials, either combined or separate, to the reactor or adding magnesium source to a slurry of alumina trihydrate and/or its thermally treated form or vice versa and adding the resulting slurry to the reactor. It is possible to treat, for instance the aluminum trihydrate slurry at elevated temperature and then add either the Mg source pro se, or add the Mg source in a slurry or solution either to the reactor or the aluminum source slurry. Given particular facilities which might be available, the continuous process can be conducted hydrothermally. This is particularly advantageous, because it this is faster and a higher conversion is obtained. There is no need to wash or filter the product, as unwanted ions (e.g. sodium, ammonium, chloride, sulphate) which are frequently encountered when using other preparation methods, are absent in the product.

In a further embodiment of the invention, the process is conducted in a multistep process, e.g. a slurry of ATH and Mg source is treated thermally in a first reactor at a mild temperature, followed by a hydrothermal treatment in a second reactor. If desired a preformed anionic clay may be added to the reactor. The preformed clay may be recycled anionic clay from the reaction mixture or anionic clay made separately by the process according to the invention or any other process.

If desired, organic or inorganic acids and bases, for example for control of the pH, may be fed to the reactor or added to either the magnesium source or the aluminum source before they are fed to the reactor. An example of a preferred pH modifier is an ammonium base, because upon drying no deleterious cations remain in the anionic clay.

If desired, the anionic clay prepared by the process according to the invention may be subjeed to ion exchange. Upon ion exchange the interlayer charge-balancing acetate ion is replaced with other anions. The other anions are the ones commonly present in anionic clays and include pillaring anions such as $V_{10}O_{28}^{-6}$, $Mo_7O_{24}^{6-}$ $PW_{12}O_{40}^{3-}$ $B(OH)_4^-$; $B_4O_5(OH)_4^{2-}$, $HBO_4^{2-}$, $HGaO_3^{2-}$ $CrO_4^{2-}$. Examples of suitable pillaring anions are given in U.S. Pat. No. 4,774,212 which is included by reference for this purpose. The ion exchange can be conducted before or after drying the anionic clay and aluminum source-containing composition formed in the slurry.

The process of the invention provides wide flexibility in preparing products with a wide range of Mg:Al ratios. The Mg:Al ratio can vary from 1 to 10, preferably from 1 to 6, more preferred from 2 to 4, and especially preferred to close to 3.

For some applications it is desirable to have additives, both metals and non-metals, such as rare earth metals, Si, P, B, group VI, group VIII, alkaline earth (for instance Ca and Ba) and/or transition metals (for example Mn, Fe, Ti, Zr, Cu, Ni, Zn, Mo, Sn), present. The metals and non-metals can easily be deposited on the anionic clay or the solid solution according to the invention or they can be added either to the alumina source or magnesium source which are added to the reactor or added the reactor separately. Suitable sources of metals or non-metals are oxides, halides or any other salt such as chlorides, nitrates etc. In the case of a multi-step process the metals and nonmetals may be added in any of the steps. Is can be especially advantageous for controlling the distribution of the metals and nonmetals in the anionic clay.

The present invention is illustrated by the following examples which are not to be considered limitative by any means.

EXAMPLES

All examples according to the invention were made in air at 1 atm. It is also possible to prepare the anionic clays under nitrogen or carbon dioxide-free atmosphere, so that the anionic clay comprises less carbonate as a balancing anion.

Comparative Example 1

A commercially available sample of a Mg—Al acetate anionic clay was obtained from Laroche Chemical Company. Its PXRD pattern is shown for illustration in FIG. 1.

Comparative Example 2

The following example illustrates the preparation of an acetate anionic clay by coprecipitation.

5.14 g of magnesium nitrate and 3.75 g of aluminum nitrate were dissolved in 50 ml of de-ionized water. 11.48 g of sodium acetate were dissolved in 90 ml of de-ionized water. The nitrate solution was added drop-wise to the acetate solution, with the pH maintained at 10 by the addition of a solution made up as follows: 100 ml of de-ionised water, 12 g of (3N) NAOH, and 6.2 g of sodium acetate (0.75 N), all under a nitrogen atmosphere at room temperature. The PXRD pattern is shown in FIG. 2.

Comparative Example 3

4.28 g of magnesium acetate and 3.75 g of aluminum nitrate were dissolved in 50 ml of de-ionised water. 3.75 g of sodium acetute were dissolved in 90 ml of de-ionised water. The nitrate solution was then added dropwise to the acetate solution, with the pH maintained at 10 by the addition of a solution made up as follows: 100 ml of do-ionised water, 12 g of 3N NAOH, and 6.2 g of sodium acetate (0.75 N) in air at room temperature. The PXRD pattern is shown in FIG. 3.

Comparative Example 4

4.28 g of magnesium acetate and 3.75 g of aluminum nitrate were dissolved in 50 ml of de-ionized water at 65° C. 3.75 g of sodium acetate were dissolved in 90 ml of de-ionized water, at 65° C. The nitrate solution was then added dropwise to the acetate solution, with the pH maintained at 10 by the addition of a solution made up as follows: 100 ml of de-ionized water, 12 g of 3N NAOH and 6.2 g of sodium acetate (0.75 N) in air at 65° C. The PXRD pattern is shown in FIG. 4.

Example 5

2.14 g of magnesium acetate were dissolved in 50 ml of de-ionized water and 1.0 g MgO and 2.35 g CP 1.5® (ex Alcoa) were added. The mixture was kept at 65° C. overnight. The slurry was dried in an oven at 65° C. The PXRD pattern of the product before drying is shown in FIG. 5a. The PXRD pattern of the product after drying is shown in FIG. 5b.

Example 6

2.14 g of magnesium acetate were dissolved in 50 ml of do-ionized water and 2.0 g MgO and 2.35 g CP 1.5® (ex Alcoa) were added. The mixture was kept at 65° C. overnight. The slurry was dried in an oven at 65° C. The PXRD pattern of the product is shown in FIG. 6 and corresponds to the formation of an anionic clay with acetate as the charge balancing interlayer anion.

Example 7

1.27 g of magnesium acetate were dissolved in 50 ml of de-ionized water, and 3.92 g MgO and 2.5 g Alcoa CP® 1.5 were added. The mixture was kept at 65° C. overnight. The slurry was dried in an oven at 65° C. PXRD confirmed that an anionic clay with an (003) reflection at 8.67 Å was formed in conformity the formation of an anionic clay with acetate as the charge-balancing interlayer anion. (See FIG. 7.)

Example 8

The product of Example 5 was subjected to after calcination at 735° C. for 1 hr. The PXRD pattern showed that a MG—Al solid solution was formed. (See FIG. 8).

We claim:

1. A process for the preparation of anionic clays, comprising reacting a slurry comprising aluminum trihydrate or its thermally treated form with a magnesium source and magnesium acetate to obtain an anionic clay.

2. A process according to claim 1, comprising adding acetic acid to the slurry.

3. A process according to claim 1, wherein the reaction takes place at room temperature and atmospheric pressure.

4. A process according to claim 1, wherein the magnesium source comprises MgO.

5. A process according to claim 4, wherein the process is carried out in a continuous mode.

6. A process according to claim 1, wherein the anionic clay is subjected to an ion-exchange treatment.

7. A process for the preparation of a Al—Mg solid solution, comprising:

reacting a slurry comprising aluminum trihydrate or its thermally treated form with a magnesium source and magnesium acetate to obtain an anionic clay; and subjecting said anionic clay to a heat-treatment at a temperature between 300 and 1200° C.

8. A process for the preparation of anionic clays, which comprises reacting a slurry comprising (i) a first slurry comprising thermally treated aluminum hydrate that has been combined with (ii) a second slurry comprising a magnesium source and magnesium acetate, to obtain an anionic clay.

* * * * *

UNITED STATES PATENT AND TRADEMARK OFFICE
CERTIFICATE OF CORRECTION

PATENT NO. : 6,333,290 B1
DATED : December 25, 2001
INVENTOR(S) : Dennis N. Stamires; Michael F. Brady; William Jones; and Fathi Kooli It is certified that error appears in the above-identified patent and that said Letters Patent is hereby corrected as shown below:

Column 1,
Line 15, change "species" to -- specific --;
Line 16, change "been" to -- between --;
Line 23, change "$CrO_4^{2-}$" to -- $CrO_4^{2-}$, -- and change "$HGaOs_3^{2-}$," to -- $HGaO_3^{2-}$, --;
Line 39, change " "Hydratalcitetype " to -- "Hydrotalcite-type --;
Line 40, change "*Catasis*" to -- *Catalysis* --;
Line 43, after "*chemistry*" insert -- , -- and change "*micropgrous*" to
-- *microporous* --; and
Line 56, change "HElv." to -- Helv. --

Column 2,
Line 4, change "ovenight Addtionally" to -- overnight. Additionally --;
Line 6, change " "composite " to -- "Composite --;
Line 13, change "Mg," to -- Mg --;
Line 33, after "salts" insert -- . --;
Line 38, change "few" to -- the -- and change "fifitered," to -- filtered, --;
Line 49, change "hydrotalcito" to -- hydrotalcite --;
Line 62, change "4,656,158." to -- 4,656,156. --; and
Line 65, change "hydrotalcilike" to -- hydrotalcite-like --.

Column 3,
Line 7, change "5,439,881" to -- 5,439,861 --;
Lines 34-35, change "meixnertte" to -- meixnerite --; and
Line 36, change "farm" to -- form --.

Column 4,
Line 3, change "fine-particle" to -- fine-particled --;
Line 10, change "no" to -- nitrogen --;
Line 31, change "hydrotalcilike" to -- hydrotalcite-like --;
Line 46, change "at" to -- acetate --;
Line 47, change "prepare" to -- prepared --; and
Line 64, change "Om" to -- the --.

Column 5,
Line 6, change "aluminium" to -- aluminum --;
Line 14, change "Incorporated" to -- incorporated --;
Line 37, change "Invention" to -- invention --;
Line 60, change "bayente" to -- bayerite --;
Lines 65 and 66, change "aluminium" to -- aluminum --; and
Line 67, change "trlhydrate (gibbsate)" to -- trihydrate (gibbsite) --.

UNITED STATES PATENT AND TRADEMARK OFFICE
CERTIFICATE OF CORRECTION

PATENT NO. : 6,333,290 B1
DATED : December 25, 2001
INVENTOR(S) : Dennis N. Stamires; Michael F. Brady; William Jones; and Fathi Kooli It is certified that error appears in the above-identified patent and that said Letters Patent is hereby corrected as shown below:

Column 6,
Line 19, change "peptizabie)" to -- peptizable) --;
Line 34, change "formats," to -- formate, --; and
Line 57, change "compostion." to -- composition. --.

Column 7,
Line 17, change "pro se," to -- per se, --;
Line 43, change "subjeed" to -- subjected --; and
Line 48, change "$Mo_7O_{24}^{6-}$" to -- $Mo_7O_{24}^{6-}$, --; "$PW_{12}O_{40}^{3-}$" to -- $PW_{12}O_{40}^{3-}$, --; and "B(OH)$_4^-$;" to -- B(OH)$_4^-$, --; and
Line 49, change "$HGaO_3^{2-}$" to -- $HGaO_3^{2-}$, --.

Column 8,
Line 14, after "as" insert -- charge --;
Line 37, change "acetute" to -- acetate --;
Line 41, change "do-ionised" to -- de-ionized --; and
Line 67, change "do-ionized" to -- de-ionized --.

Signed and Sealed this

Nineteenth Day of March, 2002

*Attest:*

JAMES E. ROGAN
*Attesting Officer*     Director of the United States Patent and Trademark Office